Dec. 6, 1938.
L. S. TROELL
Re. 20,940
POWER APPARATUS
Original Filed March 26, 1936 4 Sheets-Sheet 1
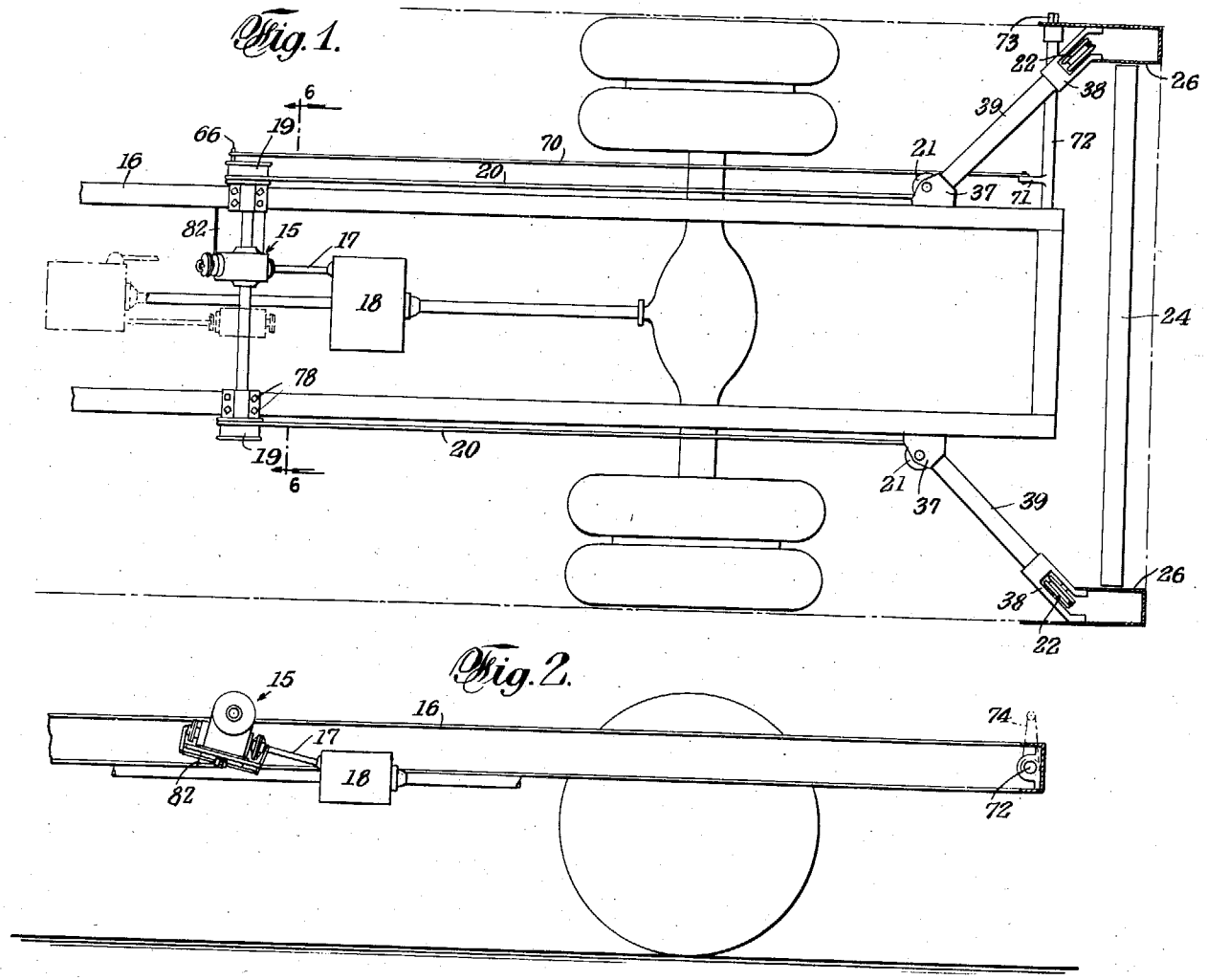
LEWIS S. TROELL
INVENTOR
BY Philip S. McGann
ATTORNEY Dec. 6, 1938. L. S. TROELL Re. 20,940
POWER APPARATUS
Original Filed March 26, 1936 4 Sheets-Sheet 2
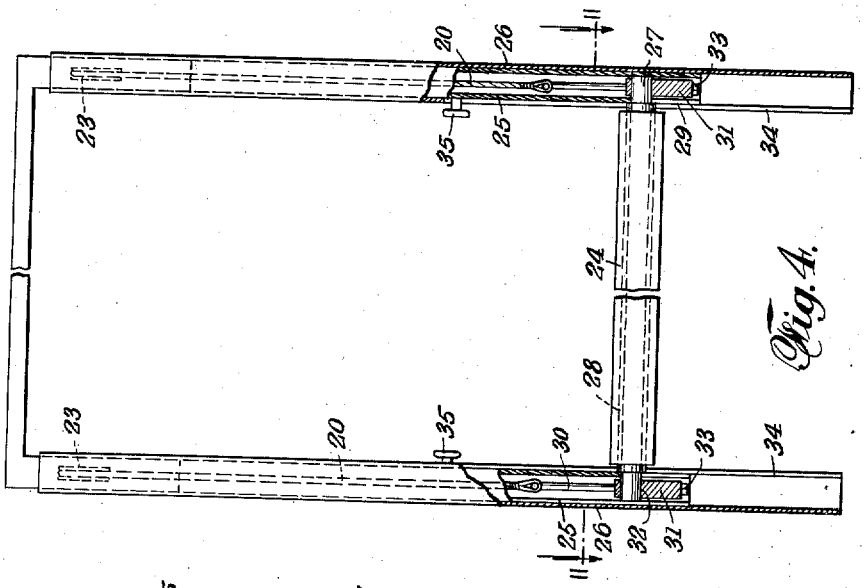
Fig. 4.
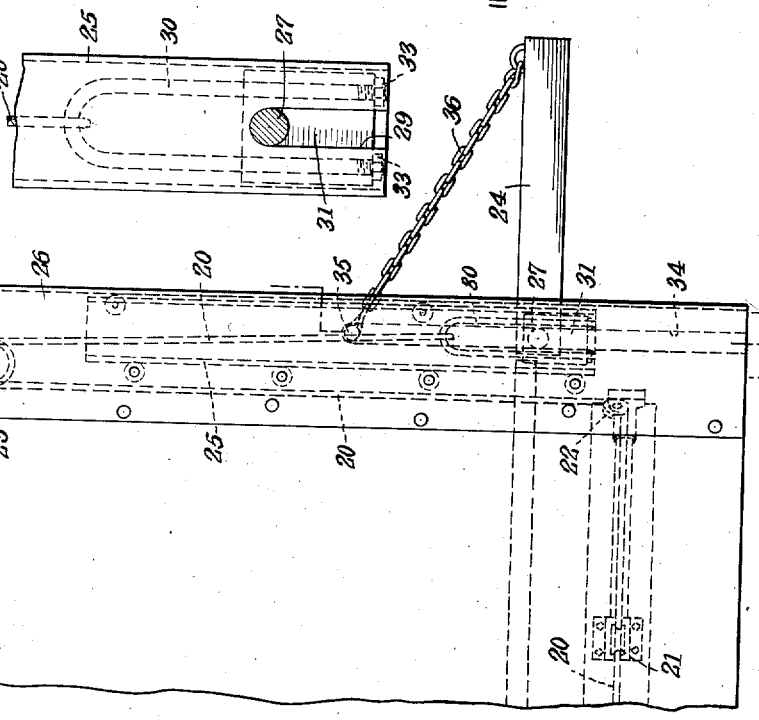
Fig. 5.
Fig. 3.
LEWIS S. TROELL
INVENTOR
BY Philip S. McGann.
ATTORNEY Dec. 6, 1938. L. S. TROELL Re. 20,940
POWER APPARATUS
Original Filed March 26, 1936 4 Sheets-Sheet 3
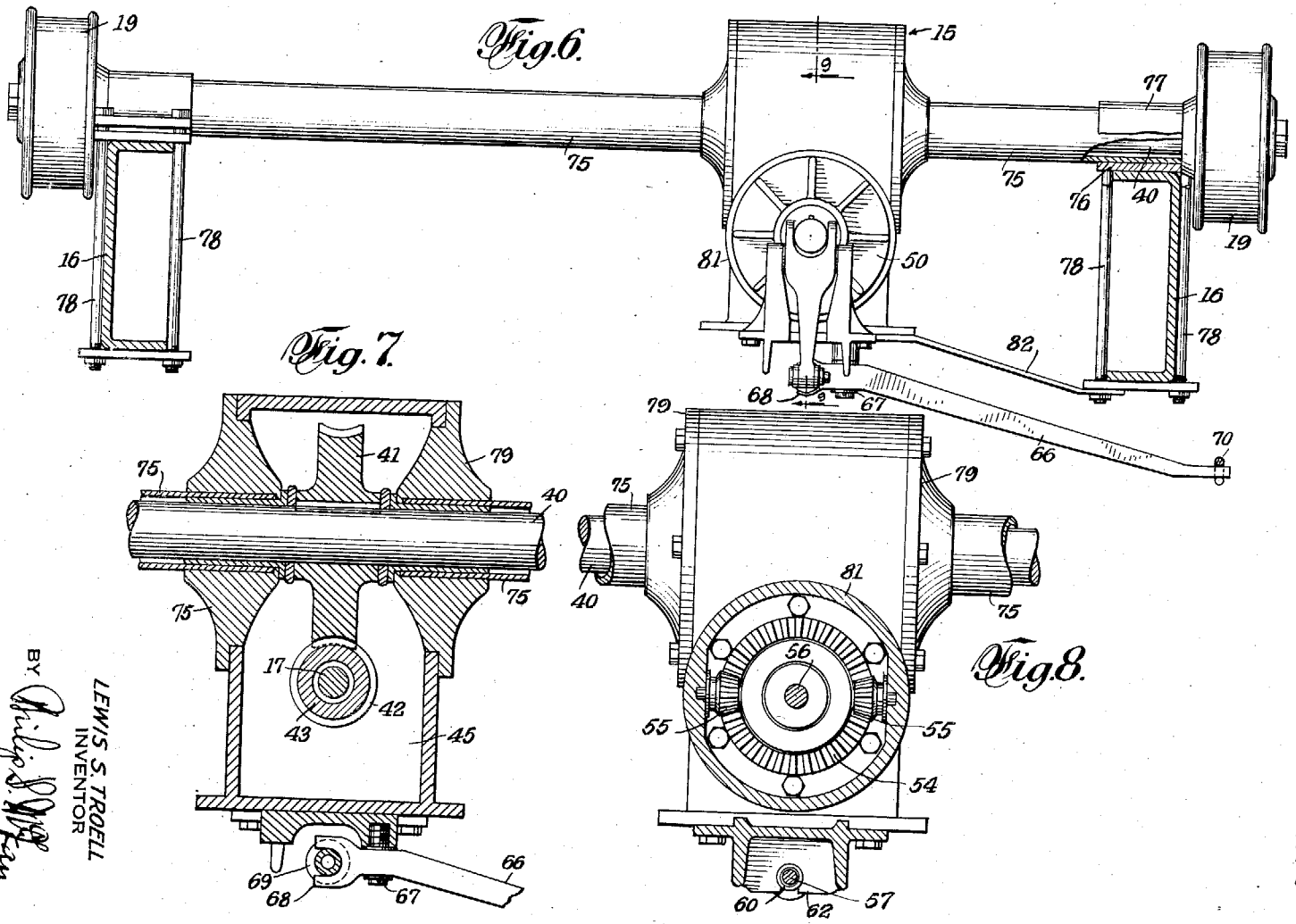
LEWIS S. TROELL
INVENTOR
BY Philip S. McKean
ATTORNEY Dec. 6, 1938.
L. S. TROELL
Re. 20,940
POWER APPARATUS
Original Filed March 26, 1936 4 Sheets-Sheet 4
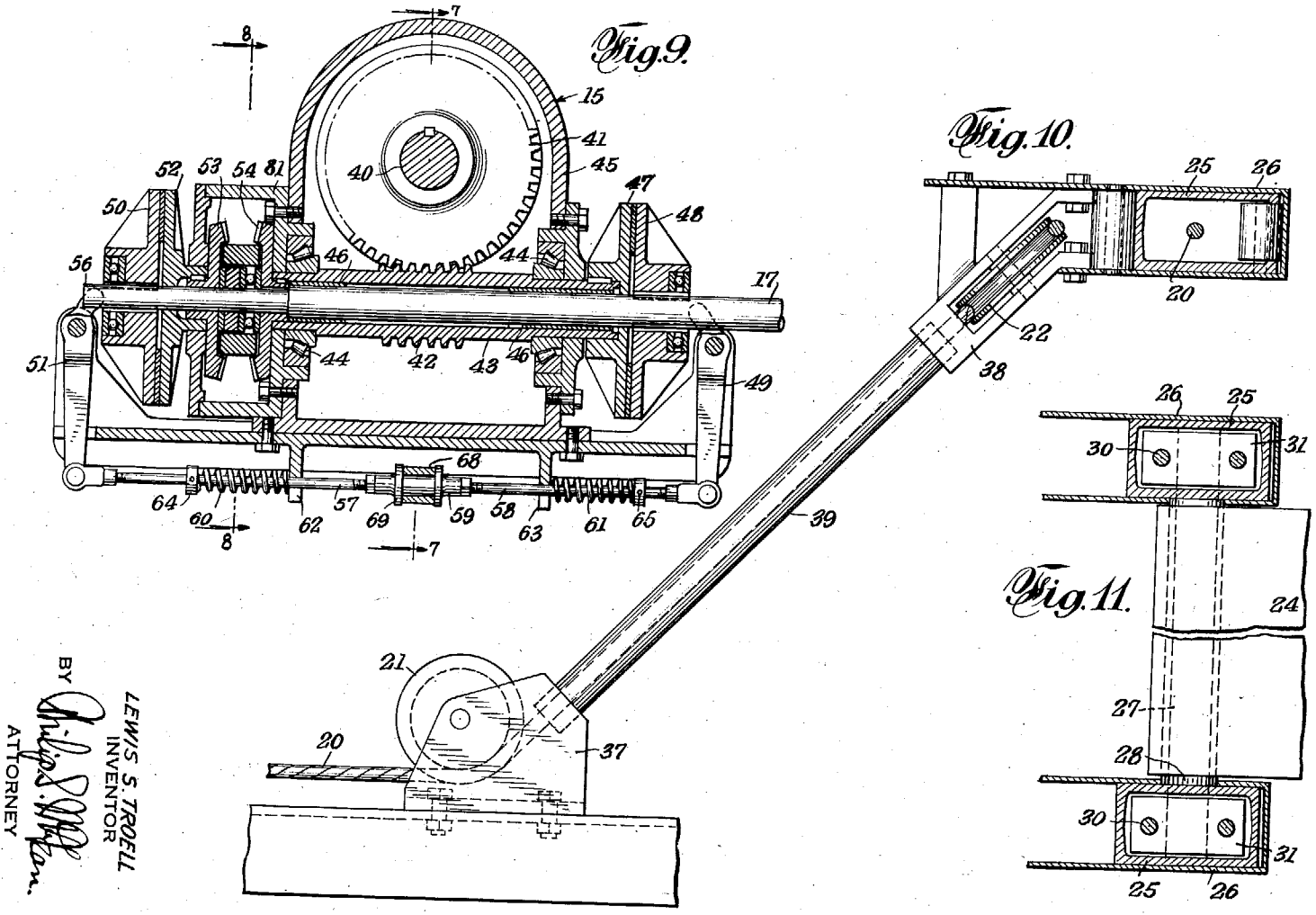
LEWIS S. TROELL
INVENTOR
BY Philip S. Mann
ATTORNEY Reissued Dec. 6, 1938

Re. 20,940

UNITED STATES PATENT OFFICE 20,940

POWER APPARATUS

Lewis S. Troell, Brooklyn, N. Y.

Original No. 2,096,214, dated October 19, 1937, Serial No. 70,979, March 26, 1936. Application for reissue August 27, 1938, Serial No. 227,190

10 Claims. (Cl. 74—379)

This invention relates to power apparatus in general, but more particularly to power devices for operating various kinds of hoists, elevators and the like.

One special application of the invention is providing the power for operating tail gate elevators, such as covered in the Troell Patents 1,919,608 and 1,977,655.

The objects of the present invention are to provide a rugged powerful unit of simple design and construction, which can be manufactured at low cost, which will be useful for many purposes and which will be particularly suited to the operating of tail gate elevators and similar loading and unloading devices.

Further special objects are to provide a compact unit of relatively light weight and small size, which can be readily mounted and adjustably set as may be required, in a relatively small space and which may be operated for forward and reverse or hoisting and lowering operations from a power takeoff shaft turning continuously in the one direction.

Other special objects are to provide apparatus of these characteristics, which can be accurately controlled and which will be reliable and safe in operation.

Other objects and the novel features of construction, combinations and relations of parts by which the objects are attained will appear and are set forth in the following specification, are illustrated in the accompanying drawings and are broadly covered in the claims.

The drawings accompanying and forming part of the specification illustrate a practical embodiment of the invention, but it should be realized that the actual physical structure may be modified and changed in various ways, all within the true intent and broad scope of the claims.

Fig. 1 is a broken plan view of one of the power units shown as applied to a motor truck for the operation of a tail gate elevator.

Fig. 2 is a broken part sectional and part side elevation view of the same.

Fig. 3 is a broken side elevation illustrating particularly the operating connections to the tail gate elevator.

Fig. 4 is a broken rear elevation of the tail gate structure with parts indicated in section as on substantially the plane of line 4—4 of Fig. 3.

Fig. 5 is an enlarged broken sectional detail of the adjustable connecting means at one end of the tail gate.

Fig. 6 is an enlarged view of the power unit as it appears transversely of the truck, substantially on the plane of line 6—6 of Fig. 1.

Figs. 7 and 8 are further enlarged broken sectional views of the unit as on substantially the planes of lines 7—7 and 8—8 of Fig. 9.

Fig. 9 is a longitudinal sectional view of the unit as on substantially the plane of line 9—9 of Fig. 6.

Fig. 10 is a broken part sectional detail of part of the guides for carrying the hoisting cables from the truck frame out of the elevator rams at the rear of the truck body.

Fig. 11 is a broken part sectional view of the rams and tail gate as on substantially the plane of line 11—11 of Fig. 4.

In Figs. 1 and 2, the power unit is indicated at 15, mounted on the side sills 16, of a truck frame and operated through shafting 17, from the transmission 18, to turn the drums 19, for cables 20, which pass over guide pulleys 21 and 22, upwardly and down over pulleys 23, Figs. 3 and 4, to the slidably mounted tail gate 24.

The slidable mounting and guiding of the tail gate is effected in the illustration by the hollow rams 25, operating in the enclosing guides 26, and connected at their lower ends by the cross rod 27, to which the cables are attached and which forms the hinging support for the tail gate. For the latter purpose, the tail gate has a bushing or sleeve 28, which rides on the rod 27, and which abuts the inner faces of the rams, Figs. 4 and 11, to act as a definite spacer between the same. The opposing inner walls of the rams are shown as slotted upwardly from the bottom at 29, to receive the cross shaft 27, and to provide seats against which this shaft can exert upward thrust on the rams. The outside walls of the rams then serve as abutments for the ends of the cross shaft. This construction permits of certain transverse levelling adjustments of the tail gate and preferably the cables are connected in a manner to facilitate such adjustments. Thus in the illustration the cable ends are engaged with inverted U bolts 30, which extend down through bearing blocks 31, having open bearings 32, in their upper ends for the end portions of the cross shaft, the nuts 33 on the lower ends of these U bolts enabling ready adjustment and permitting the "dropping" of the tail gate if required, for repair or replacement.

The inner sides of the guides 26 are shown slotted at 34, for passage of the tail gate sleeve 28, and for passage of the inwardly extending studs 35, on the rams which form the supports for the tail gate chains 36.

The lower guide pulleys 21 and 22 are shown in Figs. 1 and 10, as journalled on vertical and horizontal axes respectively in angled brackets 37, 38, fixedly engaged with opposite ends of the hollow struts 39, and secured respectively to the sides of the truck frame and to the lower end portions of ram guides 26.

As shown in Figs. 6 to 9, the cable drums 19, are fixed on the ends of a shaft 40, which has fixed on it at an intermediate point, a worm gear 41. The latter is engaged by a worm 42, carried by an integral or separately formed tubular shafting 43, journalled at opposite ends by combination radial and thrust bearings 44, in a gear casing 45.

The power takeoff shafting 17 extends through and is free to rotate within the tubular worm shaft 43, and is shown in Fig. 9, as having bearings in the opposite ends of that shaft at 46.

Power for lifting and lowering is transmitted from shaft 17, to the worm through clutches disposed at opposite ends of the worm shaft and one direct connected with that shaft and the other connected through a set of reversing gears.

In Fig. 9, the clutch at the right is the hoisting clutch and comprises a clutch element 47, fixed on the extended end of the tubular worm gear shaft 43, and a companion clutch element 48, slidably keyed on power shaft 17, and controlled by the forked clutch lever 49.

The clutch at the left in Fig. 9 is the lowering clutch and comprises a movable clutch element 50, slidably keyed on power shaft 17, and shiftable under control of clutch lever 51, in respect to clutch member 52, which is keyed to bevel gear 53, opposite a corresponding bevel gear 54 fixed to the opposite extended end of the worm gear shaft 43, motion reversing bevel pinions 55, Fig. 8, being journalled on fixed centers in position interposed between these facing gears.

In the present illustration, the reversing or lowering load is practically nil, so the reversing clutch and gearing can be of quite light construction and as indicated, the power shaft may be lightened to take these latter parts by turning down the reduced extension of the same, 56, Fig. 9.

To effect simultaneous reverse actuation of the clutches, the two clutch levers 49, 51, are shown directly connected together by clevis links 57, 58, and these are indicated in Fig. 9 as adjustably coupled by a turn-buckle nut 59, for enabling the accurate setting of the two clutches.

For holding the both clutches normally disengaged, centralizing springs are indicated at 60, 61, Fig. 9, bearing against forked lugs 62, 63, on the bottom of the gear case and acting against fixed shoulders 64, 65, on the clevis links.

Various connections for operating the clutches may be employed, depending upon particular installations. In the present disclosure, a shifting lever 66, is shown pivoted at 67, to the underside of the gear case, Figs. 6 and 7, and as having a forked inner end 68, engaged between shoulders 69, on the turnbuckle nut 59, the outer end of said lever being connected by link 70, Figs. 1 and 2, with arm 71, on a rock shaft 72, having a squared outer end 73, for reception of a control crank or lever 74.

The gear case 45 is shown in Figs. 6, 7 and 8, as extended at the sides by tubing 75, to enclose the drum shaft 40, and carry the outer bearings for the latter. These tubular extensions of the gear case also provide the means for mounting the unit, on the frame of the truck, they being shown as seating on bearing plates 76, resting on the sills 16, and over which are secured the clamp plates 77, held by bolts 78. This construction enables the unit to be readily fixed at any position longitudinally of the truck frame and to be set at any angle which may be required for the power takeoff from the transmission or other power source. Also, as will be further evident, this method of mounting enables the unit to be entirely turned around from the position shown in full lines, Fig. 1, to that indicated in broken lines, as for connecting with a transmission located in front instead of in back of the same.

The shaft casing extensions 75, are shown in Figs. 6, 7 and 8, as carried by the detachable side plates 79, of the gear case and these are illustrated as interchangeable for enabling the locating of the power unit to either side of the longitudinal center of the truck, that, is, when these tubular casing extensions are of different lengths, as in the illustration.

In similar fashion, the bearing caps 80, 81, Fig. 9, for the opposite ends of the tubular worm shaft may be interchangeably secured in the opposite ends of the gear case 45, so that if required, the forward and reverse clutch mechanism may be interchanged at opposite ends of the unit. Thus by the reversibility of parts described and the reversible adjustable mounting of the unit as a whole, the construction may be adapted to and used to meet many different requirements.

To aid in holding the unit in the desired angular relation to which it may be set, a brace or braces, such as indicated at 82, Figs. 1 and 6, may be extended from the bottom or underslung portion of the gear case to one or more of the clamp bolts 78, securing the unit down on the truck frame.

The parts of the unit are compactly arranged so that it requires but comparatively small space and all parts are rugged and strong, adapted to heavy service over extended periods without attention. All parts can be fully lubricated from an ample supply of lubricant contained in the gear case. With the clutches disengaged as normally, there is practically no power loss as the power take-off shaft simply turns idly in its bearings. The worm gearing provides a desired speed reduction for hoist and other power purposes and serves as well to hold the hoist or other mechanism in any desired relation at the instant of de-clutching. The unit may be directly connected with the power source by shafting and universal joints, or be driven through the regular standard S. A. E. transmission openings. Also, it may be operated by chain and sprockets, or gears applied to the power shaft 17, at either end of the unit. With this special combination, the hoist may be instantly started, stopped or reversed. The full power is available for hoisting, but since the lowering is effected by merely backing the worm away from the worm gear, only small bevel gears are required at the reversing end of the machine. Friction clutches are preferred for easy starting purposes and these provide a safety factor in that they may slip to prevent over-loading or breakage of parts. Both lifting and lowering is accomplished from a single shaft constantly rotating in the one direction and providing instantly available power. The structure is well balanced, the underslung construction causing it to run smoothly and quietly without vibration. The tail gate hinge bar simply floats in the supporting blocks permitting adjustments to be made for levelling the tail gate. These adjustments are at the ends of the cables, beneath the floating hinge blocks and can be readily made by one knowing the structure. While adapted to many uses, the power unit is of particular utility combined with the cable hoist in the manner here disclosed.

What is claimed is:

1. In a power unit of the character disclosed, the combination of a worm gear and a worm for driving the same, a power shaft extending rotatably through said worm, clutches at opposite ends of said worm for coupling the same with said power shaft, one of said clutches being directly connected with the worm for effecting rotation of the same with the power shaft and direction reversing gearing at the other clutch for effecting rotation of the worm, counter to the power shaft, a shaft operated by said worm gear, a casing for said worm gearing, including oppositely projecting tubular extensions in which said worm gear shaft is journaled and adjustable supporting means for said tubular extensions and by which said entire unit may be supported in different positions.

2. In a power unit of the character disclosed, the combination of a worm gear and a worm for driving the same, a power shaft extending rotatably through said worm, clutches at opposite ends of said worm for coupling the same with said power shaft, one of said clutches being directly connected with the worm for effecting rotation of the same with the power shaft and direction reversing gearing at the other clutch for effecting rotation of the worm, counter to the power shaft, a shaft carrying said worm gear, a gear case enclosing said worm gearing and worm gear shaft and means for adjustably securing said gear case in different angular relations.

3. A power unit of the character disclosed comprising in combination, a worm gear, a worm engaged therewith and having tubular shafting, bearings at opposite ends of and supporting said tubular worm shafting against endwise movement, a clutch element at one end of and mounted to rotate with said tubular worm shafting, a gear at the opposite end of and mounted to rotate with said tubular worm shafting, a power shaft extending rotatably through said tubular worm shafting, a companion clutch element on said shafting opposed to said first clutch element, a second gear opposed to said first gear, a motion reversing gear interposed between said first and second gears, a clutch element connected to rotate with said second gear, a companion clutch element carried by said power shaft and means for effecting selective engagement and disengagement of said companion clutch elements at the opposite ends of said worm shafting.

4. A power unit of the character disclosed comprising in combination, a worm gear, a worm engaged therewith and having tubular shafting, bearings at opposite ends of and supporting said tubular worm shafting against endwise movement, a clutch element at one end of and mounted to rotate with said tubular worm shafting, a gear at the opposite end of and mounted to rotate with said tubular worm shafting, a power shaft extending rotatably through said tubular worm shafting, a companion clutch element on said shafting opposed to said first clutch element, a second gear opposed to said first gear, a motion reversing gear interposed between said first and second gears, a clutch element connected to rotate with said second gear, a companion clutch element carried by said power shaft and means for effecting selective engagement and disengagement of said companion clutch elements at the opposite ends of said worm shafting, the clutch elements which turn with the shafting being slidably keyed thereon and shiftable into and out of engagement with the companion clutch elements and said companion clutch elements being keyed respectively to said worm shafting and to said second gear.

5. A power unit of the character disclosed comprising in combination, a worm gear, a worm engaged therewith and having tubular shafting, bearings at opposite ends of and supporting said tubular worm shafting against endwise movement, a clutch element at one end of and mounted to rotate with said tubular worm shafting, a gear at the opposite end of and mounted to rotate with said tubular worm shafting, a power shaft extending rotatably through said tubular worm shafting, a companion clutch element on said shafting opposed to said first clutch element, a second gear opposed to said first gear, a motion reversing gear interposed between said first and second gears, a clutch element connected to rotate with said second gear, a companion clutch element carried by said power shaft and means for effecting selective engagement and disengagement of said companion clutch elements at the opposite ends of said worm shafting, one of said clutch elements at each end of the worm shafting being relatively shiftable toward and away from the companion clutch element and said means for effecting selective engagement and disengagement of the clutch elements, including reversely acting levers for shifting said relatively shiftable clutch elements in opposite directions, linkage connecting said levers to effect clutch engaging movement of one lever upon clutch releasing movement of the other lever, spring means for centralizing said linkage to hold both clutch levers normally in neutral position and a control member connected with said linkage for positively shifting the same in one direction or the other in opposition to said centralizing means.

6. A reversible power unit comprising a worm gear, a worm engaged therewith and having tubular shafting, bearings at opposite ends of and supporting said worm shafting against endwise movement, a clutch element carried by one end of said worm shafting, a bevel gear carried by the opposite end of said worm shafting, a power shaft extending rotatably through said worm shafting, a clutch element slidingly keyed on said power shafting opposite said first clutch element, a bevel gear mounted in opposition to said bevel gear at the other end of said worm shafting, an interposed motion reversing bevel pinion between and in mesh with said bevel gears, a clutch element carried by said second bevel gear, a companion clutch element slidingly keyed on said power shaft, levers mounted to thrust said slidingly keyed clutch elements on the power shaft into engagement with the companion clutch elements and means for shifting said levers in opposite directions to effect selective engagement and disengagement of the clutch elements described.

7. A power unit of the character disclosed comprising in combination, a worm gear, a worm engaged therewith and having tubular shafting, bearings at opposite ends of and supporting said tubular worm shafting against endwise movement, a clutch element mounted to rotate with said tubular worm shafting, a gear mounted to rotate with said tubular worm shafting, a power shaft extending rotatably through said tubular worm shafting, a companion clutch element on said shafting opposed to said first clutch element, a second gear opposed to said first gear, a motion reversing gear interposed between said first and second gears, a clutch element connected to rotate with said second gear, a companion clutch element carried by said power shaft and means for effecting selective engagement and disengagement of said companion clutch elements.

8. A reversible power unit comprising a worm gear, a worm engaged therewith and having tubular shafting, bearings at opposite ends of and supoprting said worm shafting against endwise movement, a clutch element carried by one end of said worm shafting, a bevel gear carried by said worm shafting, a power shaft extending rotatably through said worm shafting, a clutch element slidingly keyed on said power shafting opposite said first clutch element, a bevel gear mounted in opposition to said bevel gear, an interposed motion reversing bevel pinion between and in mesh with said bevel gears, a clutch element carried by said second bevel gear, a companion clutch element slidingly keyed on said power shaft, lever means mounted to thrust said slidingly keyed clutch elements on the power shaft into engagement with the companion clutch elements and means for shifting said lever means in opposite directions to effect selective engagement and disengagement of the clutch elements described.

9. A reversible power unit comprising a worm gear, a worm engaged therewith and having tubular shafting, bearings at opposite ends of and supporting said worm shafting against endwise movement, a gear carried by said worm shafting, a second gear opposed to said first gear and rotatable relatively thereto, an interposed motion reversing gear between said first and second gears, a drive shaft extending rotatably through said tubular worm shafting, reversely acting clutches between said drive shaft and worm shafting and between said drive shaft and said second gear respectively and reversely operating means for effecting alternate engagement and disengagement of the respective clutches.

10. A reversible power unit comprising, a driven shaft, a worm gear on said driven shaft, a worm engaged with said worm gear and rotating on an axis substantially at a right angle to the axis of said driven shaft, bearings supporting said worm against endwise movement, a gear carried by said worm, a second gear opposed to said first gear and rotatable relatively thereto, an interposed motion reversing gear between and in mesh with said first and second gears, a drive shaft in concentric relation with said worm and substantially at a right angle to said driven shaft, reversely acting clutches between said drive shaft and the worm and between said drive shaft and the second gear respectively and reversely operating means for effecting alternate engagement and disengagement of said respective clutches.

LEWIS S. TROELL.